(12) United States Patent
Dixon

(10) Patent No.: US 7,748,728 B2
(45) Date of Patent: Jul. 6, 2010

(54) KID CAB TRIKE

(76) Inventor: Mark William Dixon, 599 Wurtemburg Rd., Rhinebeck, NY (US) 12572

( * ) Notice: Subject to any disclaimer, the term of this patent is extended or adjusted under 35 U.S.C. 154(b) by 19 days.

(21) Appl. No.: 12/152,743

(22) Filed: May 16, 2008

(65) Prior Publication Data

US 2009/0184488 A1 Jul. 23, 2009

Related U.S. Application Data

(60) Provisional application No. 61/011,432, filed on Jan. 17, 2008.

(51) Int. Cl.
*B62K 7/02* (2006.01)
*B62K 21/00* (2006.01)
(52) U.S. Cl. ................. 280/202; 280/266; 280/288.1
(58) Field of Classification Search ................ 280/204, 280/202, 282, 266, 288.1; 180/214, 213, 180/211
See application file for complete search history.

(56) References Cited

U.S. PATENT DOCUMENTS

| 86,405 A | * | 2/1869 | Irwin | 280/231 |
|---|---|---|---|---|
| 3,164,396 A | * | 1/1965 | Morris | 280/202 |
| 4,283,070 A | * | 8/1981 | Forrestall et al. | 280/274 |
| 4,432,561 A | * | 2/1984 | Feikema et al. | 280/282 |
| 4,456,277 A | * | 6/1984 | Carpenter | 280/282 |
| 4,497,502 A | | 2/1985 | Forbes et al. | |
| 4,546,992 A | | 10/1985 | Swartz et al. | |
| 4,881,187 A | * | 11/1989 | Read | 200/5 D |
| 4,974,759 A | * | 12/1990 | McDonough | 224/443 |
| 5,020,814 A | * | 6/1991 | George et al. | 280/204 |
| 5,076,599 A | * | 12/1991 | Lockett et al. | 280/204 |
| 5,174,622 A | * | 12/1992 | Gutta | 296/77.1 |
| 5,267,744 A | * | 12/1993 | Berry et al. | 280/204 |
| 5,308,096 A | * | 5/1994 | Smith | 280/204 |
| 5,460,395 A | * | 10/1995 | Chen | 280/204 |
| 5,568,935 A | * | 10/1996 | Mason | 280/282 |
| 5,575,443 A | * | 11/1996 | Honeycutt | 248/231.9 |
| 5,599,033 A | * | 2/1997 | Kolbus et al. | 280/204 |
| 5,785,333 A | * | 7/1998 | Hinkston et al. | 280/204 |
| 5,829,771 A | * | 11/1998 | Hsu | 280/204 |
| 5,853,062 A | * | 12/1998 | Hulett | 180/206 |
| 6,062,581 A | * | 5/2000 | Stites | 280/263 |
| D455,679 S | | 4/2002 | Tai et al. | |
| 6,388,871 B1 | * | 5/2002 | Masui | 361/679.04 |
| 6,406,049 B1 | * | 6/2002 | Jimison et al. | 280/288.4 |

(Continued)

FOREIGN PATENT DOCUMENTS

DE 3345831 A1 * 7/1985

*Primary Examiner*—Lesley Morris
*Assistant Examiner*—Wesley Potter

(57) ABSTRACT

A recumbent tricycle pedicab consisting of a front frame and a rear frame pivotally interconnected in a manner which enables steering by leaning. The front frame supports, a single wheel, a pedal and drive mechanism, and a driver's seat, while the rear frame supports a fixed handlebar and a two-wheeled passenger/cargo cab. A cab frame supports side panels, a front to rear panel, a passenger seat at least one storage pouch, and signal lights. At least one window or panel which can be rolled down for protection of the passengers or rolled-up and secured to allow ventilation. The front to rear panel opens to allow entry. The pedicab also has a cargo and storage area behind the passenger seat and contents are secured using at least one cargo net attached to the cab frame. Decking on rear frame provides a floor for cab and entry area.

12 Claims, 6 Drawing Sheets

U.S. PATENT DOCUMENTS

| | | | |
|---|---|---|---|
| D467,203 S * | 12/2002 | Potter et al. | D12/111 |
| 6,659,488 B1 * | 12/2003 | Beresnitzky et al. | 280/282 |
| 6,742,797 B2 * | 6/2004 | Lopez | 280/287 |
| 6,959,938 B1 * | 11/2005 | Liu | 280/204 |
| 7,011,320 B1 * | 3/2006 | Gomez | 280/204 |
| 7,261,175 B1 * | 8/2007 | Fahrner | 180/207 |
| 7,379,798 B2 * | 5/2008 | Takeda et al. | 701/29 |
| 2002/0074764 A1 * | 6/2002 | Allen et al. | 280/204 |
| 2004/0026891 A1 * | 2/2004 | Berkelmans | 280/282 |

* cited by examiner

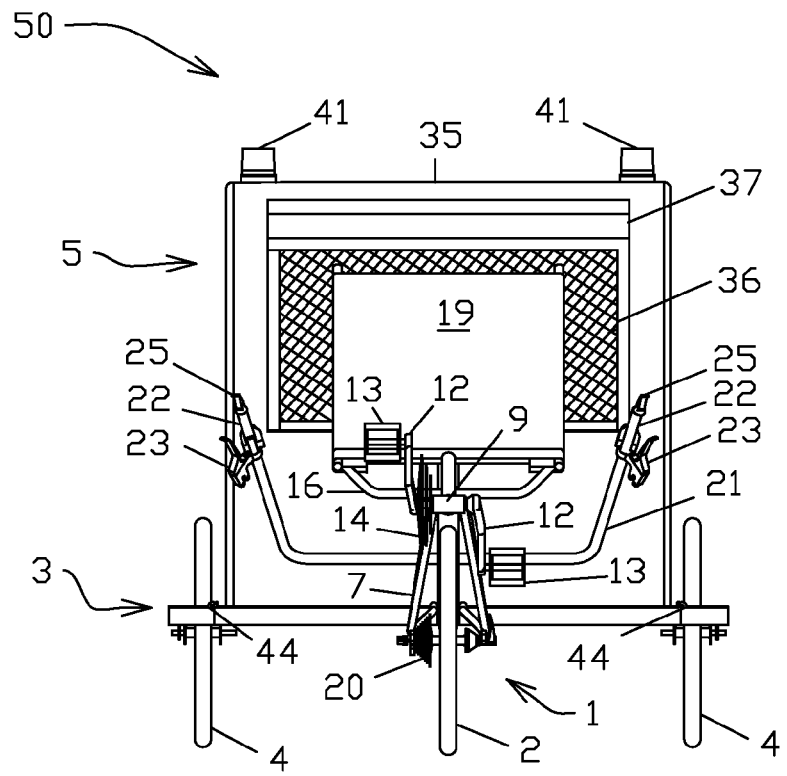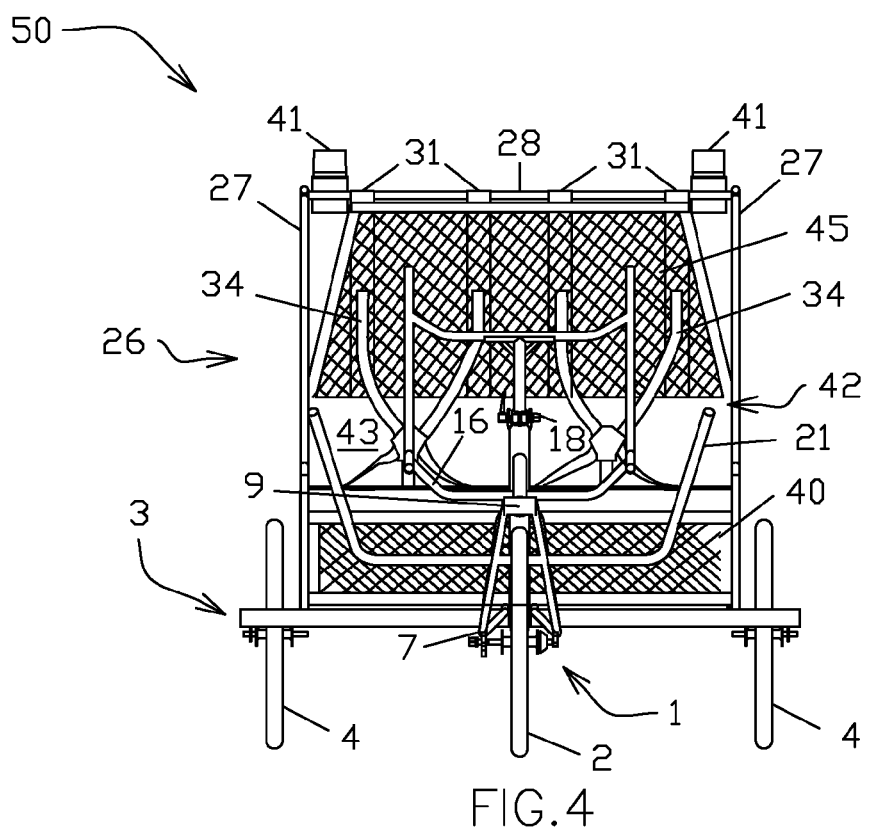

US 7,748,728 B2

KID CAB TRIKE

CROSS-REFERENCE TO RELATED APPLICATION

The instant patent application is related to U.S. Provisional Patent Application Ser. No. 61/011,432, filed on Jan. 17, 2008, titled "Kid Cab Trike," the disclosure of which is incorporated herein by reference.

FIELD OF THE INVENTION

The present invention relates generally to a recumbent tricycle. More particularly, the invention relates to a recumbent pedicab. The invention further relates to a kid cab pedicab. The inventive pedicab can accommodate at least one passenger and is light-weight and/or modular for easy transportation from one location to another location. The recumbent tricycle has at least one enclosure to seat and protect the passengers. A front frame and a rear frame are pivotally interconnected. The front frame supports, preferably, a single wheel drive mechanism and a driver's seat, while the rear frame supports at least a two-wheeled passenger cab. The cab frame supports fabric forming side panels, front to rear panel, passenger seat, at least one storage pouch, and signal lights. The rear cab portion has at least one window or panel which can be rolled down for protection of the passengers or rolled-up and secured to allow an open view or ventilation for the passengers. The inventive pedicab also has a cargo and storage area which is preferably behind the passenger seat and where the contents are secured using at least one cargo net attached to the cab frame. Lightweight decking on rear frame provides floor for cab and entry area.

BACKGROUND INFORMATION

Pedicabs have been known and used through out the world. Conventional pedicabs resemble a rickshaw consisting of a carriage seat with overhead canopy for passengers, and the rear attached to the front portion of an ordinary bicycle for the driver. Such vehicles are quite heavy, they also leave passengers more open to the elements and flying debris, and they do not provide the protection required for a passenger, especially, a child passenger. While newer designs provide more protection, the resulting increased weight is not desirable.

U.S. Pat. No. 4,497,502 (Forbes, et al.), the disclosure of which is incorporated herein by reference, discloses a recumbent tricycle including a frame, twin rear wheels pivotally mounted to the frame and steerable by a pair of levers pivotally mounted to the frame on either side of a passenger seat. The rear wheels are oriented substantially vertically and are attached to hubs inclined inwardly toward the frame to create a cambered effect which maintains the rear wheels in a forward-facing position as the tricycle moves in a rectilinear path. The single front wheel is preferably driven by a pedal crank assembly mounted rearwardly of the front wheel and forwardly of the passenger seat.

U.S. Pat. No. 4,546,992 (Swartz, et al.), the disclosure of which is incorporated herein by reference, discloses a pedicab with a relatively short turning radius includes a front frame with handle bars on the front end thereof, pedals and a drive sprocket in bearings beneath the handle bars, a driver's seat on the top rear end of the frame and a three-speed hub and driven sprocket on the rear bottom of the frame substantially vertically aligned with the seat, the drive and driven sprockets being connected by an endless chain. A two-wheeled cab is pivotally connected to the rear end of the front frame.

Even with these improvements, a need exists for an improved pedicab.

Thus a need exists for a pedicab which is light weight and can easily be driven by a single individual driver.

A need also exists for a pedicab which has seat belts for the safety and security of passengers, especially, child passengers.

Furthermore, a need also exists for a pedicab that has at least one storage area for carrying supplies.

A further need also exists for a pedicab that has signal indicators to allow the driver to indicate a turn with a signal and then safely make that turn.

This invention overcomes the problems of the prior art. The invention provides a pedicab that is compact and has easy maneuverability for the operator, while providing safety and security to the passengers.

PURPOSES AND SUMMARY OF THE INVENTION

The invention is a novel pedicab apparatus.

Therefore, one purpose of this invention is to provide a novel pedicab which is lightweight, easy and safe to operate with cargo space while providing protection, ventilation, and comfort for passengers, especially, child passengers.

Another purpose of this invention is to provide a lightweight pedicab apparatus which allows a single operator to operate the pedicab.

Yet another purpose of this invention is to provide a novel pedicab which has seat belts for the safety and security of passengers, especially, child passengers.

Still, yet another purpose of this invention is to provide a pedicab that has at least one storage area for carrying content or supplies.

Yet another purpose of this invention is to provide a pedicab that has signal indicators to allow the driver to indicate a turn with a signal and then safely make that turn.

Therefore, in one aspect this invention comprises a pedicab, comprising:

(a) a front frame and a rear frame, wherein said front frame is connected to said rear frame by at least one pivot connection;

(b) said front frame having secured to it at least one seat for a driver of said pedicab and at least one front wheel;

(c) at least one pedal mechanism secured to said front frame, wherein said pedal mechanism is connected to said front wheel via at least one chain mechanism;

(d) said rear frame having secured thereto at least two rear wheels, at least one handle bar for steering said pedicab, and at least one cab frame; and (e) wherein said cab frame has at least one seat for at least one passenger, and wherein at least one fabric material surrounds said cab frame to environmentally protect said at least one passenger.

BRIEF DESCRIPTION OF THE DRAWINGS

The features of the invention that are novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

FIG. 3 is a front elevation view of the pedicab of FIG. 1.

FIG. 4 is a front elevation view of the pedicab as shown in FIG. 2.

DETAILED DESCRIPTION

In one aspect the present invention relates to a pedicab comprising front frame means; seat means for an operator on top of said front frame means; front wheel means rotatably mounted on said front frame means for rotation around a horizontal axis mounted below the operator; pedal means on said frame means substantially forward of the operator; drive means connecting said pedal means with said wheel means to propel the pedicab; rear frame means pivotally connected to said front frame means; handle bar means fixed mounted on said rear frame means allowing operator to lean said front frame means toward desired direction of travel; brake control means mounted on said handle bar means; light switch means mounted on said handle bar means; gear control means mounted on said handlebar means; rear wheel means rotatably mounted on said rear frame means for rotating around a horizontal axis mounted on apposing sides of said rear frame means; decking means mounted horizontally on top of said rear frame means; cab frame means attached to said rear frame means; side panel means attached to sides of said cab frame; window means in side panel means; seat means attached to inside of said cab frame means; ventilation means through said seat means; seatbelt means attached to said seat means; front to rear panel means secured to front of rear frame means and stretched across the top of said cab frame and secured to back of rear frame means; window means in said front to rear panel means; ventilation means in said window means of said front to rear panel means; signal light means attached to top of said cab frame means; and storage pouch means attached to said cab frame means to allow additional storage for passengers and cargo within.

The invention in another aspect is a recumbent vehicle having an enclosed cab for passengers, where the recumbent vehicle is a vehicle which places the operator in a seated or supine or face up position, and rarely, in a prone or face down position.

Figure 1:
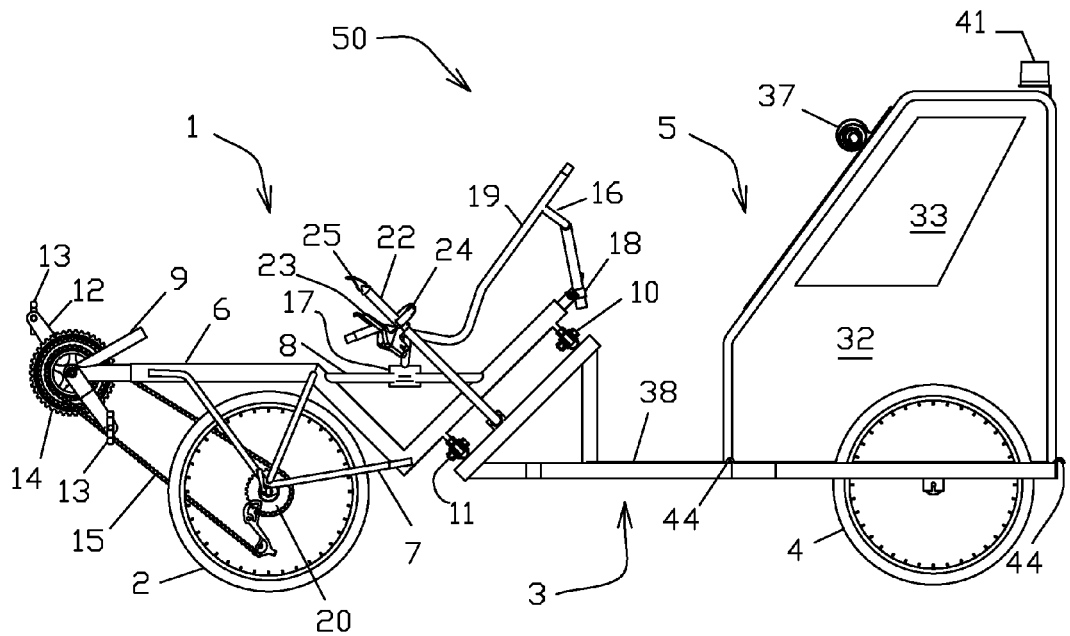
FIG. 1 is a side elevation view of an exemplary pedicab which is used to illustrate a first embodiment of the present invention.
Figure 2:
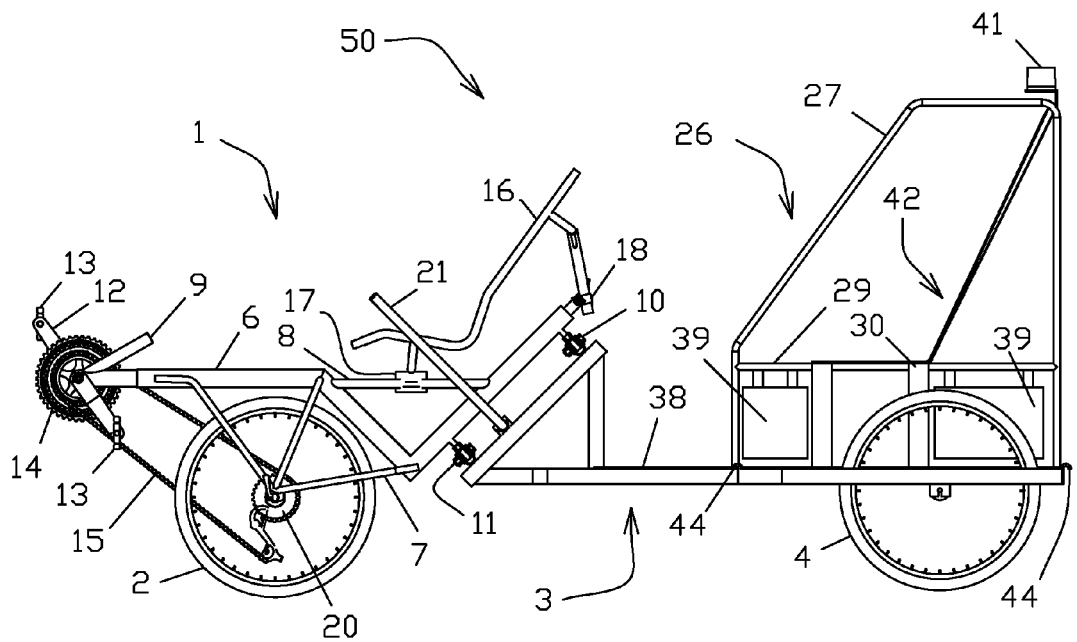
FIG. 2 is a side elevation view of the pedicab of FIG. 1 without the cab panels and the front seat.
Figure 5:
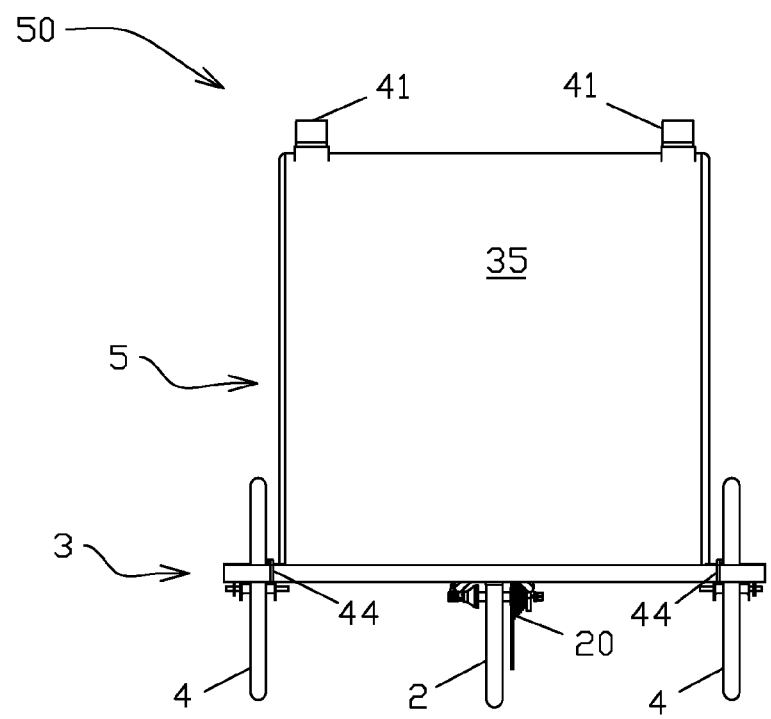
FIG. 5 is a rear elevation view of the pedicab of FIGS. 1 and 3.
Figure 6:
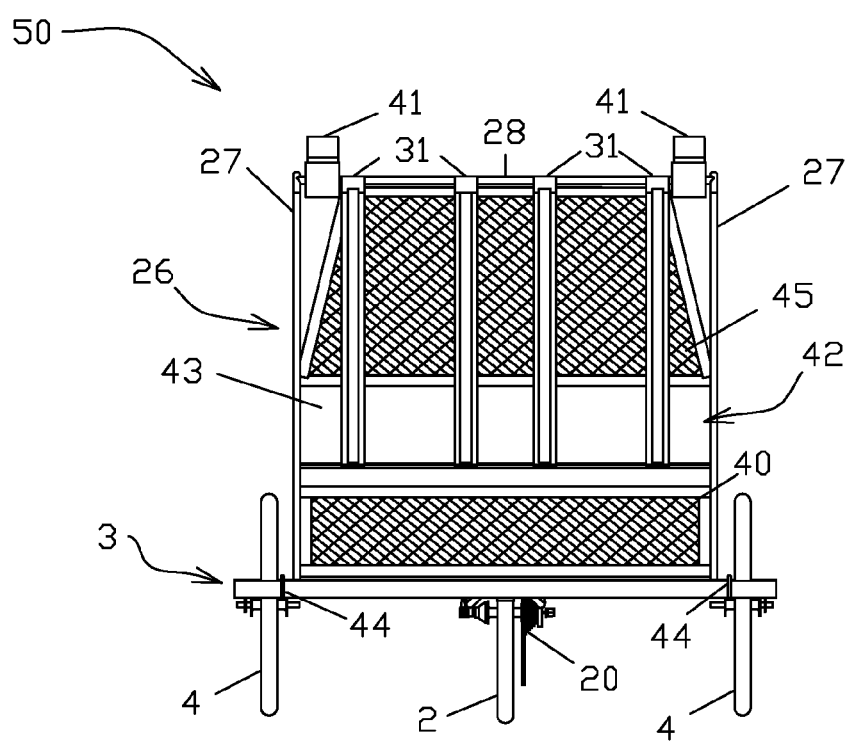
FIG. 6 is a rear elevation view of the pedicab as shown in FIGS. 2 and 4.
Figure 7:
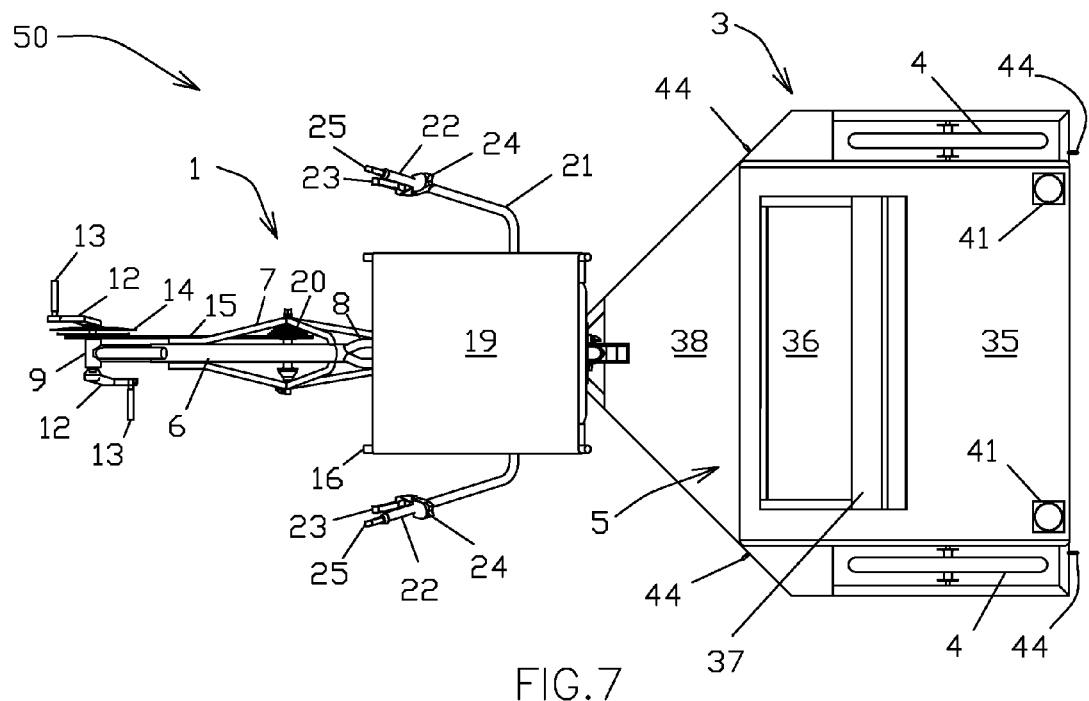
FIG. 7 is a plan view of the pedicab of FIGS. 1, 3 and 5.
Figure 8:
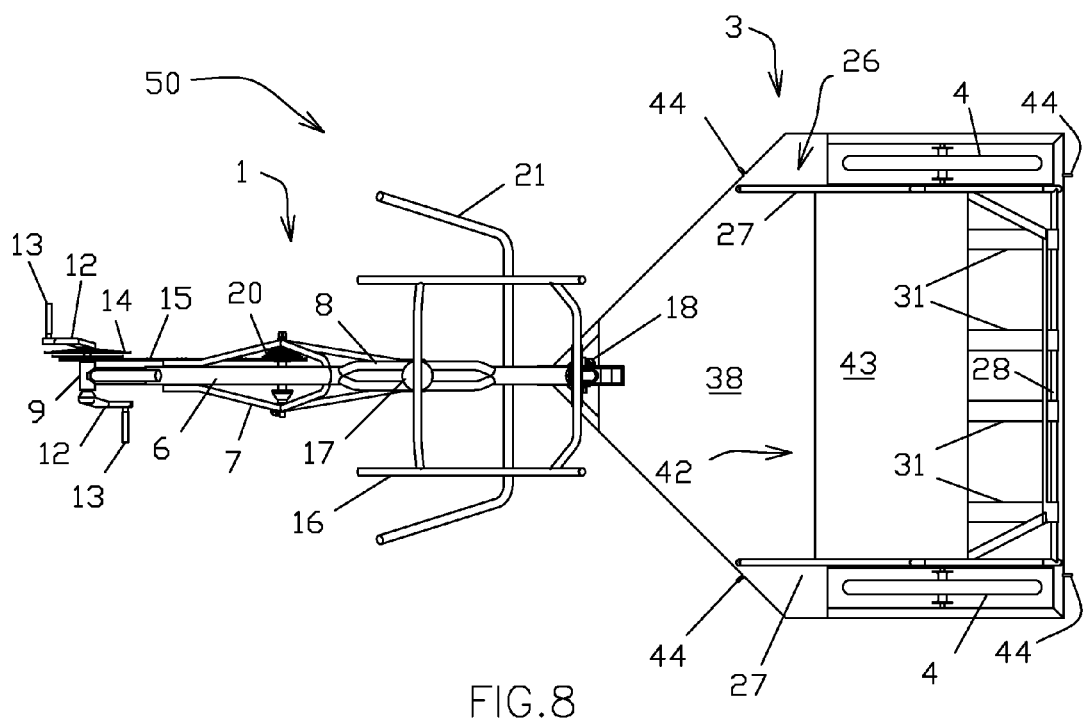
FIG. 8 is a plan view of the pedicab as shown in FIGS. 2, 4 and 6.
Figure 9:
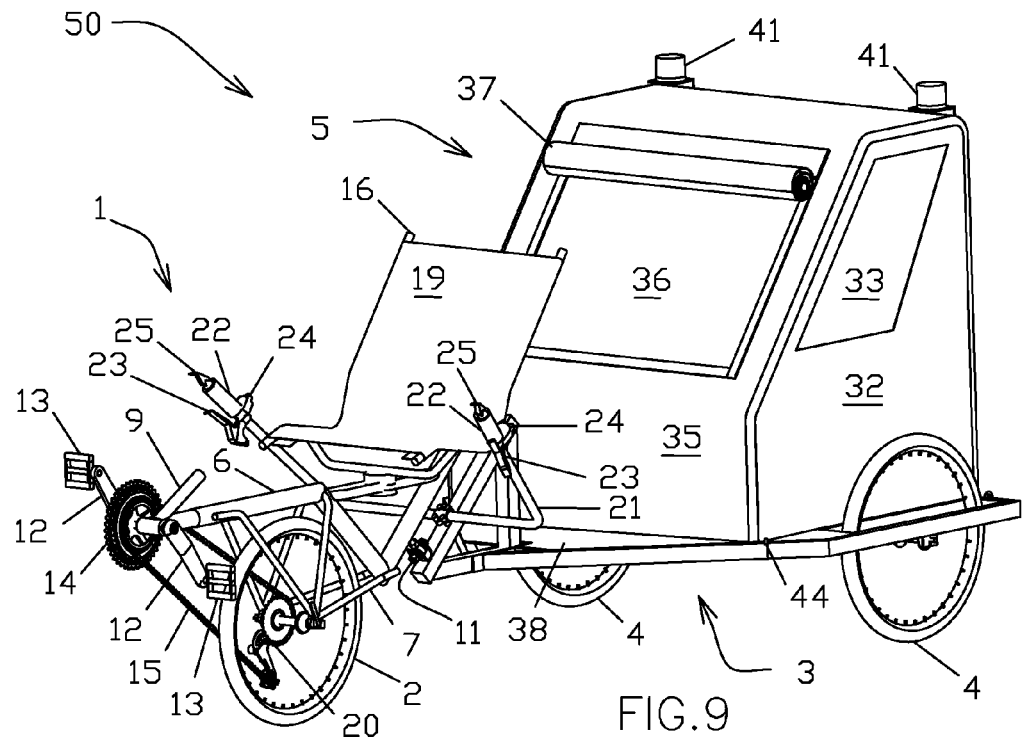
FIG. 9 is a front perspective view of the pedicab of FIGS. 1, 3, 5 and 7.
Figure 10:
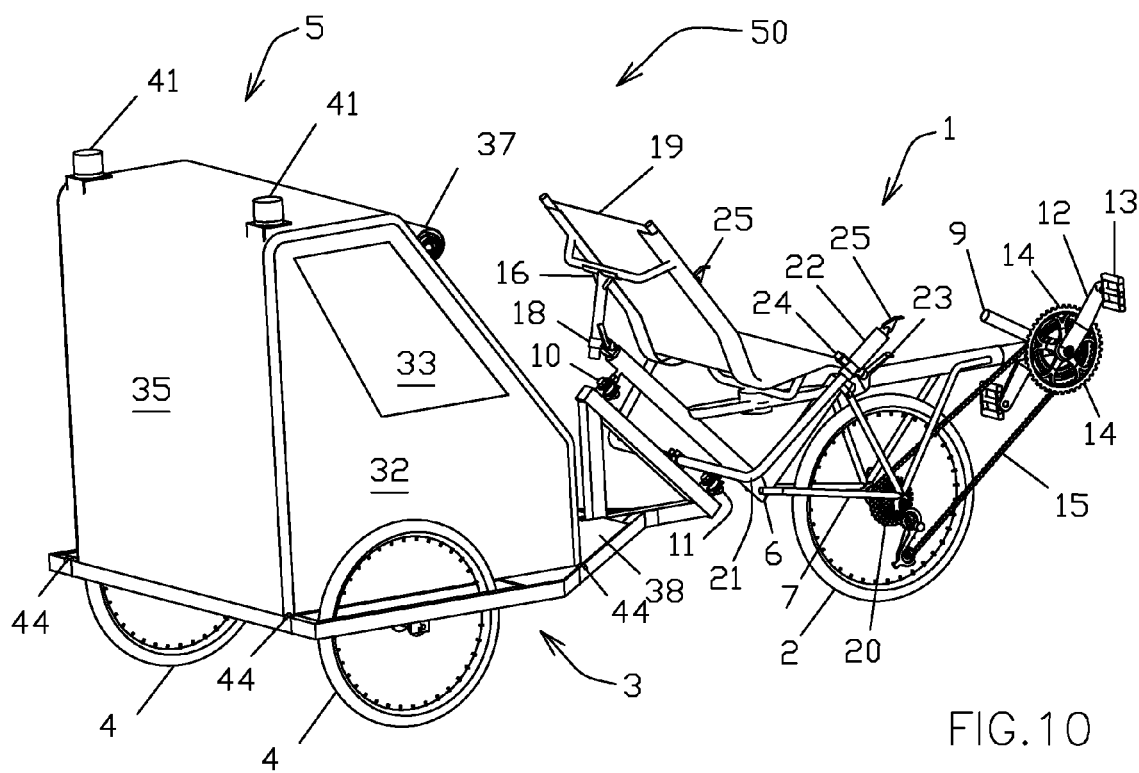
FIG. 10 is a rear perspective view of the pedicab of FIGS. 1, 3, 5 and 7.
Figure 11:
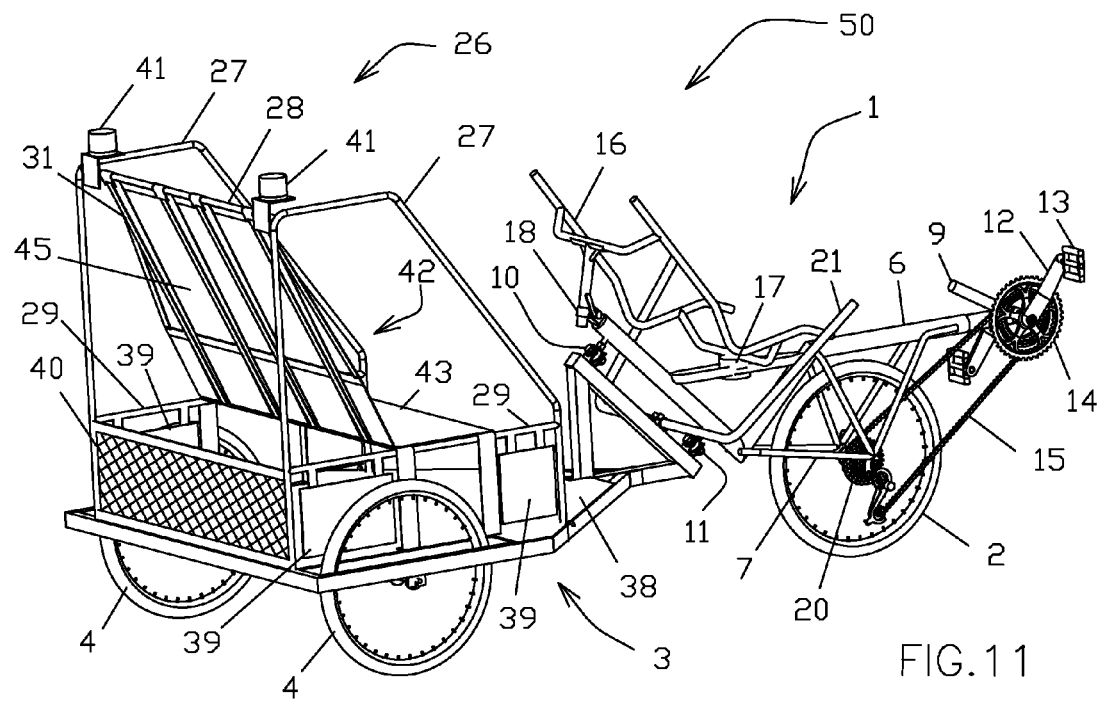
FIG. 11 is a rear perspective view of the pedicab as shown in FIGS. 2, 4, 6 and 8 without rear frame hooks.
Figure 12:
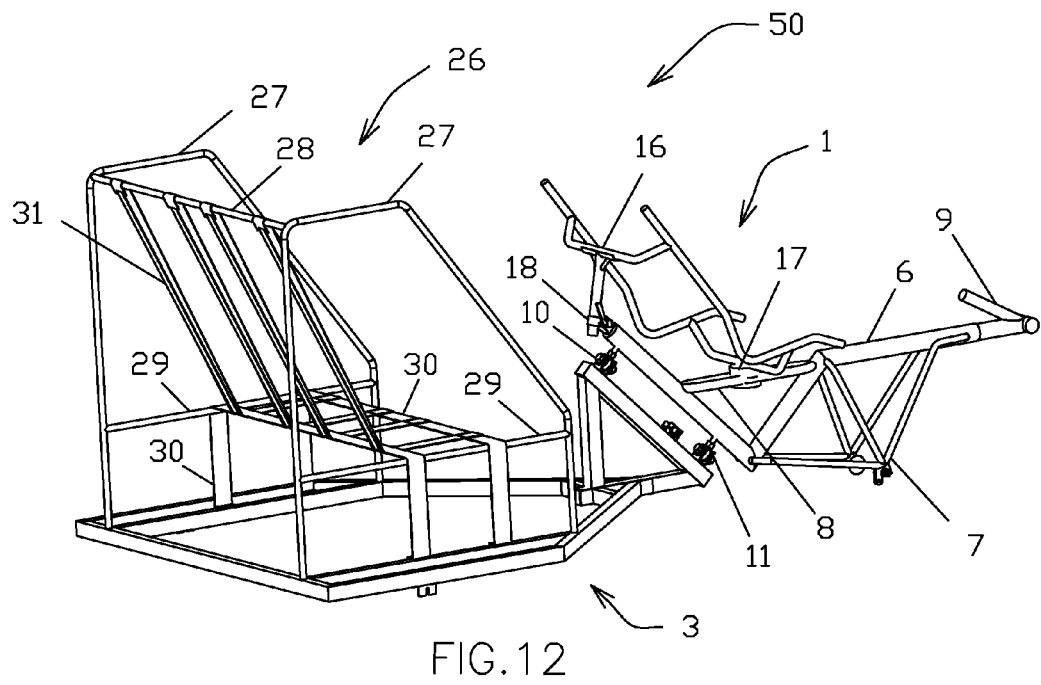
FIG. 12 is a rear perspective view of the front frame, rear frame, cab frame, seat back webbing, and seat base webbing, of the pedicab as illustrated in FIGS. 1 through 11.

FIG. 1 is a side elevation view of an exemplary pedicab 50, which is used to illustrate a first embodiment of the present invention, while FIG. 2 is a side elevation view of the pedicab 50, of FIG. 1 without cab panels 32, 35, 36, 37, and the front seat. FIG. 3 is a front elevation view of the pedicab 50, of FIG. 1, and FIG. 4 is a front elevation view of the pedicab 50, as shown in FIG. 2. FIG. 5 is a rear elevation view of the pedicab 50, of FIGS. 1 and 3, and FIG. 6 is a rear elevation view of the pedicab 50, as shown in FIGS. 2 and 4. FIG. 7 is a plan view of the pedicab 50, of FIGS. 1, 3 and 5, while, FIG. 8 is a plan view of the pedicab 50, as shown in FIGS. 2, 4 and 6. FIG. 9 is a front perspective view of the pedicab 50, of FIGS. 1, 3, 5 and 7, and FIG. 10 is a rear perspective view of the pedicab 50, of FIGS. 1, 3, 5 and 7. FIG. 11 is a rear perspective view of the pedicab 50, as shown in FIGS. 2,4, 6 and 8 and without rear frame hooks 44, and FIG. 12 is a rear perspective view of the front frame 1, rear frame 3, cab frame 5, seat back webbing 31, and seat base webbing 30, of the pedicab 50, as illustrated in FIGS. 1 through 11.

Referring to FIGS. 1 through 12, which illustrate a preferred embodiment of the kid cab trike or kid cab pedicab or recumbent vehicle, where a front frame generally indicated at 1, is pivotally connected to a rear frame generally indicated at 3, at least one front wheel 2, rotatably mounted to the front frame 1, a pair of rear wheels indicated at 4, rotatably mounted on rear frame 3, and a cab generally indicated at 5, mounted on rear frame 3.

The front frame 1, is defined by a frame body 6. Welded to the frame body 6, is a fork frame 7, and a seat attachment member 8. Extending out of the front of frame body 6, is an adjustable crankset frame 9. Adjustable crankset frame 9, includes a crank set 12, two pedals 13, a front chain gear 14, and at least one chain 15. An upper pivot connection 10, and lower pivot connection 11, attaches the rear of frame body 6, to the front of rear frame 3. It is preferred that the pedals 13, and the crankset 12, are ahead of the front wheel 2. For some applications it is preferred that the center of the crankset 12, is in line with or parallel to the frame body 6.

A front seat frame 16, is adjustably attached to at least one seat attachment member 8, by a forward front seat connector 17, and the front seat frame 16, is adjustably attached to frame body 6, by at least one front seat connector 18. The back of front seat 19, is securely fastened to front of seat frame 16, while the rear of the base of the front seat 19, is securely fastened to the seat attachment member 17.

The front wheel 2, is rotatably mounted to the fork frame 7, and includes at least one rear chain gear 20. Chain 15, preferably runs on the front and rear chain gears 14 and 20.

The rear frame generally indicated at 3, is a platform-type frame with an upper pivot connection 10, and lower pivot connection 11. Handle bar 21, are preferably securely attached to the front of the rear frame 3. A cab deck 38, is attached to the top of rear frame 3. The rear wheels 4, are rotatably mounted to and adjacent opposite sides of the rear frame 3.

As more clearly shown in FIGS. 3, 7, 8, 9 and 10, the handle bar 21, that is preferably fixedly attached to the rear frame 3, further preferably includes hand grips 22, brake levers 23, directional light switches 24, and at least one gear changer 25. The brake levers 23, are connected to the front and rear brakes (not shown) preferably by coaxial cables (not shown).

The cab generally indicated at 5, is attached to the rear frame 3, between the rear wheels 4. The cab 5, consists of a cab frame generally indicated at 26, having side panels 32, preferably made of a fabric like material, which are secured to the cab frame 26, and rear frame 3. Front to rear panels 35, are preferably fastened to rear frame hooks 44. At least one cab seat generally indicated at 42, is preferably attached to the cab 5, and cab frame 26 and rear frame 3. At least one storage pouch 39, at least one cargo net 40, and a plurality of signal lights 41, are preferably secured to the cab frame 26.

As more clearly shown in FIGS. 11 and 12, cab frame 26, consists of two cab side frames 27, fixedly connected to and adjacent opposite sides of rear frame 3, between rear wheels 4. It is preferred that the cab cross-bar 28, run horizontally between and are fixedly connected to the cab side frames 27. Horizontal seat support members 29, are preferably connected and secured to the cab side frames 27, at appropriate seat height. In some embodiments storage pouches 39, are preferably attached to seat support members 29.

It is preferred that the side panels 32, include at least one side window 33, and is connected and secured to the cab side frames 27.

For some applications a cab front to rear panel 35, is fastened to cab cross bar 28, and stretched over cab frame 26. Ends of front to rear panel 35, are preferably secured to the rear frame 3, by a plurality of rear frame hooks 44, and connected to the rear frame 3. Cab front to rear panel 35, preferably includes mesh window 36, which may be covered over by rolling down front window 37, over a portion of the rear panel 35, and the mesh window 36.

The cab seat generally indicated at 42, is more clearly described with reference to FIGS. 11 and 12, where the cab seat 42, preferably comprises seat base webbing 30, which is tensioned over seat support members 29, and fixedly attached to rear frame 3. Seat back webbing 31, is attached to top of forward seat base webbing 30, and bottom of rear seat base webbing 30, and then pulled over cab cross-bar 28, and adjustably attached back to rear seat base webbing 30. Cab seat 42, includes cab seat base 43, mesh seat back 45, and is attached to seat base webbing 30, and seat back webbing 31. At least one seat belt 34, is provided and preferably the seat belt 34, is attached and secured to cab seat 42.

A pair of signal lights 41, are mounted on top of cab cross-bar 28, and are controlled by directional light switches 24. Battery power (not shown) for signal lights 41, is stored in one of storage pouches 39. Signal lights 41, directional light switches 24 and battery power are connected by wiring (not shown).

As more clearly shown with reference to FIGS. 3, 7 and 9, during operation of the pedicab the driver or operator (not shown) sits on the front seat 19, puts hands on handgrips 22, and places feet on pedals 13. While pedaling pedals 13, and holding handle bar 21, driver leans front frame 1, toward the desired direction of travel to steer. The driver controls signal lights with directional light switches 24, shifts gears with gear changers 25, and brakes with brake levers 23.

The passengers preferably enter the cab by detaching the front end of the front to rear panel 35, from the rear frame hooks 44, and lifting it up over the top of cab frame 26. After the seating of the passenger the driver then refastens the front end of front to rear panel 35, to the rear frame hooks 44. Depending upon the weather conditions the passengers may ride with the front window 37, rolled up and exposing the mesh window 36. Additionally the rear of front to rear panel 35, can be detached from the rear frame hooks 44, and rolled up (not shown) and secured to cab rear frame 28, thus allowing passage of the elements through mesh window 36, mesh seat back 32, and out of the rear cab opening. Under other conditions, such as, when the weather is cold or it is raining or to reduce the exposure to sun, to name a few, the front window 37, can be rolled down to cover the mesh window 36. However, for some applications provision could be provided for the entrance of the passengers from the front portion of the rear frame 3.

As described in FIGS. 1-12, the inventive recumbent tri-cycle 50, has an enclosed cab for passengers, where the two frame sections are pivotally interconnected about an inclined axis defined by a front lower and rear upper pivotal connection. The rear frame supports a two-wheeled passenger cab and the front frame supports a single wheel drive mechanism and driver's seat. A cab frame supports fabric forming side panels, front to rear panel, passenger seat, storage pouches, and signal lights. Rear portion of front to rear panel is secured down and vinyl front window is rolled down for protection of passengers or rolled and secured up for ventilation of passengers through front mesh window and mesh in seat back. Front of front to rear panel is secured down to protect passengers and lifted up for entry and exit. Cargo and storage area is behind the passenger seat with cargo net attached to the cab frame across the rear opening. Lightweight decking on rear frame provides floor for cab and entry area.

The material for the side panels 32, 33, window 35, mesh window 36, front window 37, could be selected from a group comprising, a plastic-type material, a cloth material, a nylon material, a water repellant material, a fire retardant material, a polyester-type material, a vinyl-type material, to name a few.

It should be appreciated that the light switch is preferably mounted on the handle bar 21, Similarly, the switch for the signal lights 41, could also be mounted on the handle bar 21, or any other appropriate location accessible to the driver.

The power supply to any of the electrical items is preferably a 12 Volts battery. However, it is within the realm of a person skilled in the art to provide a dry cell or a 6 Volts battery or other similar means to act as the power supply for any or all of the electrical devices associated with the inventive recumbent tri-cycle 50.

In one preferred embodiment the seat base webbing 30, is tensioned over the seat support members 29, and fixedly attached to the rear frame 3. Seat back webbing 31, are attached to the top of front of the seat base webbing 30, and attached to the bottom rear of the seat base webbing 30, and then is pulled over the cab cross bar 28, and is then adjustably attached back to the rear of the seat base webbing 30. It is also preferred that at least one seat belt 34, is securely attached to the cab seat 42, for the safety and security of the passengers.

The pouch 39, could be used for securely carrying items or electronic devices. In some embodiments the storage pouch 39 could be suspended from the seat support member 29. However, it is within the realm of a person skilled in the art to securely attach the storage pouch 39 to either cab cross bar 28, or cab side frame 27, or any other appropriate location.

It is preferred that the cargo net 40, is securely attached to the rear of the cab frame 26. It should also be appreciated that hooks (not shown) could be provided to secure any component associated with the inventive recumbent tri-cycle 50.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A pedicab, comprising:
   (a) a front frame and a rear frame, wherein said front frame is connected to said rear frame by at least one pivot connection;
   (b) said front frame having secured thereto at least one front seat, at least one seat attachment member and at least one front wheel;
   (c) at least one pedal mechanism secured to said front frame and having at least one crankset, wherein said pedal mechanism is connected to said front wheel via at least one chain mechanism and wherein said crankset is ahead of said front wheel;

(d) said rear frame having secured thereto at least two rear wheels, at least one handle bar for steering said pedicab, and at least one cab frame;

(e) the front seat having a front seat frame, the front seat frame adjustably attached to the seat attachment member by a forward seat connector and adjustably attached to the front frame by a rearward seat connector; and (f) said cab frame having at least one cab seat, and wherein said cab frame is enclosed by at least one fabric panel to provide environmental protection.

2. The pedicab of claim 1, wherein said pedicab is moved by the rotation of said front wheel, and wherein power to move said front wheel is generated by pedal movements.

3. The pedicab of claim 1, wherein said handle bar has at least one driver control device associated therewith, and wherein said driver control device is selected from a group consisting of a hand grip, a brake lever, a directional light switch, and a gear changer.

4. The pedicab of claim 1, wherein at least one directional signal is secured to said rear frame.

5. The pedicab of claim 1, wherein material for said cab seat is selected from a group consisting of a fiber webbing material, a plastic webbing material, a cloth webbing material, a nylon webbing material, a composite webbing material, a fabric material, and a canvas material.

6. The pedicab of claim 1, wherein said rear frame has at least one compartment for storage.

7. The pedicab of claim 1, wherein said rear frame has at least one compartment for storage, wherein a battery may be stored in said compartment for storage.

8. The pedicab of claim 1, wherein at least one signal light is secured to said pedicab.

9. The pedicab of claim 1, wherein material for said front frame and said rear frame is selected from a group consisting of a composite material and a metallic material.

10. The pedicab of claim 1, wherein said at least one fabric panel has at least one window.

11. The pedicab of claim 1, wherein said at least one fabric panel has at least one window, and wherein at least one window panel is secured to said cab such that extension of said window panel covers said window and retraction of said window panel exposes said window.

12. The pedicab of claim 1, wherein the center of said crankset is in line with said front frame body.

* * * * *